(12) United States Patent
Hochmuth

(10) Patent No.: US 8,051,967 B2
(45) Date of Patent: Nov. 8, 2011

(54) STEP-BY-STEP MECHANISM, IN PARTICULAR FOR A SEAT ADJUSTMENT

(75) Inventor: Harald Hochmuth, Hagenbuechbach (DE)

(73) Assignee: Schaeffler KG, Herzogenaurach (DE)

( * ) Notice: Subject to any disclaimer, the term of this patent is extended or adjusted under 35 U.S.C. 154(b) by 529 days.

(21) Appl. No.: 12/303,732

(22) PCT Filed: May 24, 2007

(86) PCT No.: PCT/EP2007/055038
§ 371 (c)(1),
(2), (4) Date: Dec. 6, 2008

(87) PCT Pub. No.: WO2007/141143
PCT Pub. Date: Dec. 13, 2007

(65) Prior Publication Data
US 2010/0258391 A1    Oct. 14, 2010

(30) Foreign Application Priority Data
Jun. 7, 2006   (DE) .................... 10 2006 026 392

(51) Int. Cl.
*F16D 41/066* (2006.01)
*F16D 41/08* (2006.01)
*B60N 2/02* (2006.01)

(52) U.S. Cl. .................. 192/38; 192/15; 297/344.12

(58) Field of Classification Search ............. 192/15, 192/16, 19, 38, 44
See application file for complete search history.

(56) References Cited

U.S. PATENT DOCUMENTS

| 1,782,605 | A | * | 11/1930 | Farley ..................... 192/44 |
| 2,001,668 | A |   | 5/1935  | Maier |
| 4,457,416 | A | * | 7/1984  | Kutzler ................... 192/44 |
| 5,896,973 | A | * | 4/1999  | Hochmuth et al. ...... 192/223.2 |
| 6,032,777 | A |   | 3/2000  | Denis |
| 6,212,965 | B1 | * | 4/2001 | Hochmuth ............... 192/15 |
| 6,508,347 | B1 | * | 1/2003 | Hochmuth ............... 192/44 |
| 6,568,759 | B1 | * | 5/2003 | Hochmuth ............ 297/367 R |
| 6,641,215 | B2 |   | 11/2003 | Rohee et al. |

FOREIGN PATENT DOCUMENTS

| DE | 94 08 426 Y | 6/1995 |
| DE | 44 47 480 A | 6/1996 |
| DE | 195 18 424 Y | 11/1996 |
| DE | 198 54 931 A | 5/2000 |
| DE | 198 54 945 Y | 5/2000 |
| DE | 100 17 850 A | 3/2001 |
| DE | 101 04 591 A | 8/2001 |
| DE | 10 2005 018148 PA | 10/2006 |
| FR | 2 809 355 A | 11/2001 |

* cited by examiner

*Primary Examiner* — Rodney Bonck
(74) *Attorney, Agent, or Firm* — Lucas & Mercanti, LLP

(57) ABSTRACT

The seat adjustment mechanism has a housing with an outer ring and an inner ring. The rings are arranged concentrically. Clamping bodies interact with double clamping ramps on the rings and are arranged in an annular space between the rings. Spring supports pivot in relation to each other, interact with a stop on the housing, are arranged concentrically with the rings, and engage in each case both in the annular space and in an inner space arranged radially within the inner ring. The spring supports are braced in relation to each other by a spring, which is arranged in the inner space to secure the clamping bodies in the center of the double clamping ramps. Stop surfaces of the spring supports are acted upon by a force in the direction in which they are minimally spaced apart.

6 Claims, 6 Drawing Sheets

STEP-BY-STEP MECHANISM, IN PARTICULAR FOR A SEAT ADJUSTMENT

This application is a 371 of PCT/EP2007/055038 filed May 24, 2007, which in turn claims the priority of DE 10 2006 026 392.8 filed Jun. 7, 2006, the priority of both applications is hereby claimed and both applications are incorporated by reference herein.

FIELD OF THE INVENTION

The invention relates to a step-by-step mechanism which is suitable, in particular, for a seat adjustment means in a motor vehicle.

BACKGROUND OF THE INVENTION

A step-by-step mechanism which is configured as a clamping roller mechanism is known, for example, from DE 198 54 931 A1. In interaction with a clamping roller locking mechanism, the clamping roller step-by-step mechanism forms a setting device for adjusting a motor vehicle seat. The driven shaft of the clamping roller locking mechanism can be coupled to the driven element of the clamping roller step-by-step mechanism, the driven shaft and the driven element being mounted in or on a common housing. Overall, the setting device according to DE 198 54 931 A1 is a proven construction.

OBJECT OF THE INVENTION

The invention is based on the object of further improving a setting device for adjusting a motor vehicle seat with respect to the prior art with regard to the installation space requirement and the production options.

SUMMARY OF THE INVENTION

According to the invention, this object is achieved by a step-by-step mechanism having the features of claim 1. Said step-by-step mechanism which is suitable, in particular, for a seat adjustment means, for example a seat height adjustment means, a seat inclination adjustment means or a backrest adjustment means, has a housing component which is preferably manufactured as a sheet metal part which is formed without the removal of material, in or on which component part an outer ring which is connected to a drive element, in particular a manually actuable pivoting lever, and an inner ring which acts as driven element are arranged concentrically. The drive element can also be produced in one piece with the outer ring, in particular as a sintered part. Clamping elements, in particular clamping rollers, which interact with double clamping ramps which are preferably formed in the outer ring are provided for torque transmission between the outer ring and the inner ring. As an alternative, the formation of double clamping ramps in the inner ring or the formation of clamping contours both in the inner ring and the outer ring, which clamping contours act together as double clamping ramps, is also possible.

In order to produce a switchable freewheeling function in both rotational directions, two spring carriers which can be pivoted with respect to one another are arranged concentrically with respect to the inner ring and outer ring. The pivoting movement of each spring carrier which preferably has the basic shape of a three-armed star is delimited by a stop on the housing component. Each of the spring carriers which are preferably manufactured from plastic engages both into the annular space which is formed between the outer ring and the inner ring and into an inner space radially within the inner ring. The spring carriers which lie substantially in a common plane which is arranged perpendicularly with respect to the axis of the step-by-step mechanism are clamped against one another by at least one spring which is arranged in the inner space. Each spring carrier has stop faces which are arranged within the annular space and are provided for making contact with the clamping elements. If the clamping elements are arranged in the center of the respective double clamping ramps, the stop faces of the two spring carriers are positioned at a minimum spacing from one another. As a result of the clamping between the spring carriers, a torque acts between them, which torque attempts permanently to produce the minimum spacing between the stop faces. The stop faces can be designed in such a way that, when the clamping elements are situated in the center of the double clamping ramps, that is to say in the neutral position, they are raised up from the inner ring.

In the case of a pivoting action of the outer ring, which action produces a nonpositive connection from the outer ring to the inner ring via the clamping elements, one of the spring carriers is driven by the clamping elements, while the other spring carrier remains blocked by the stop on the housing component. Separate freewheeling springs in the annular space are not required. Rather, the at least one spring which is arranged in the inner space and clamps the spring carriers against one another acts both as a restoring spring of the drive element and as a freewheeling spring which interacts indirectly with the clamping elements. A plurality of springs which are configured as helical springs are preferably clamped between the spring carriers, the number of springs corresponding to the number of clamping elements. In the case of the transmission of a torque between the outer ring and the inner ring, the spring carriers do not have a force transmitting function. When, in contrast, the drive element is restored automatically into the neutral position by means of the springs, a force flow is produced from a spring carrier to the outer ring via the clamping elements. However, the forces which occur here are substantially lower than the forces which occur in the case of the actuation of the step-by-step mechanism by means of manual adjustment of the drive element.

In the following text, one exemplary embodiment of the invention will be explained in greater detail using a drawing, in which:

DETAILED DESCRIPTION OF THE DRAWING

Figure 1:
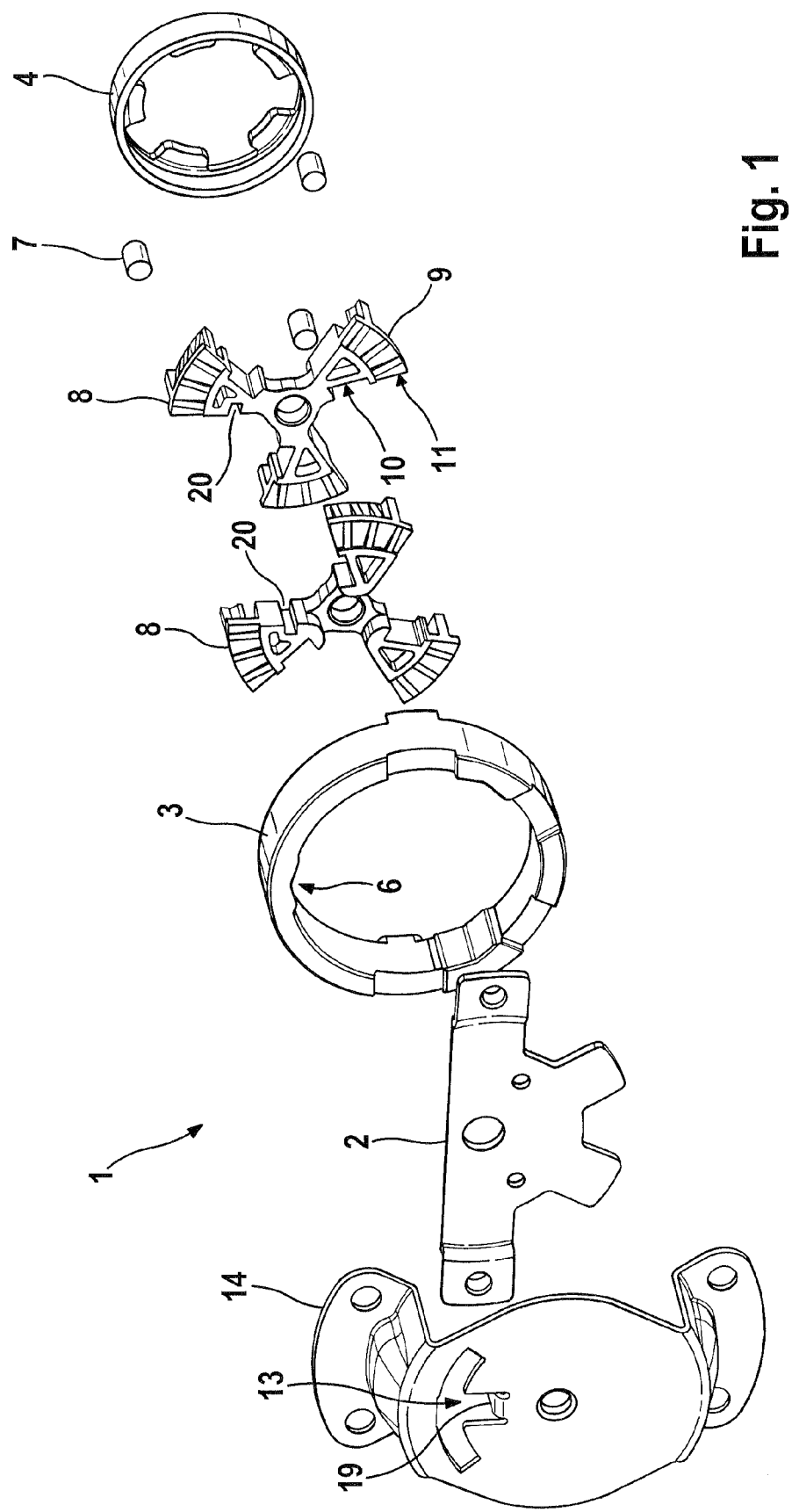
FIG. 1 shows a step-by-step mechanism in an exploded illustration.
Figure 2:
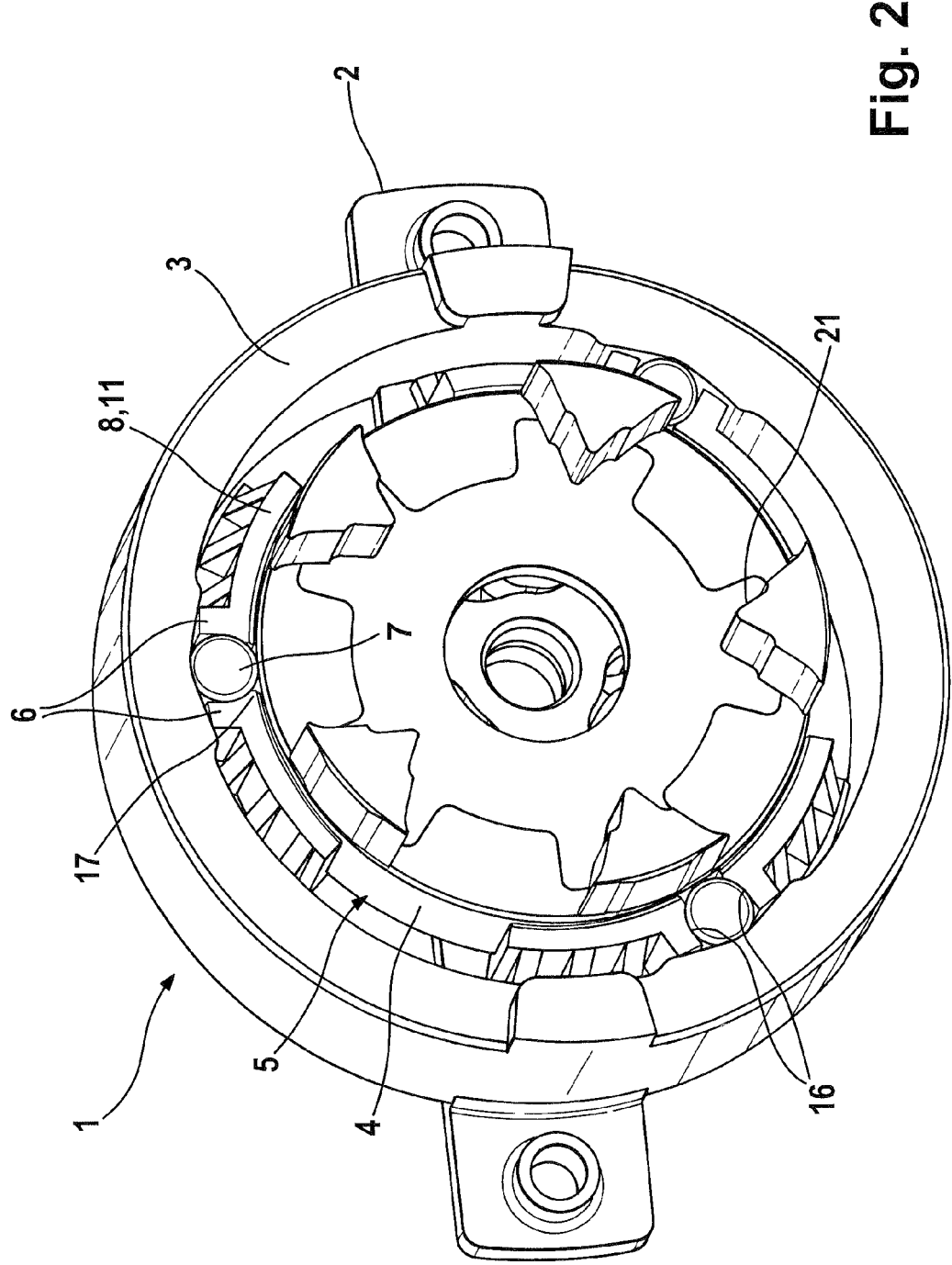
FIGS. 2 and 3 show the step-by-step mechanism according to FIG. 1 in different perspective illustrations.
Figure 3:
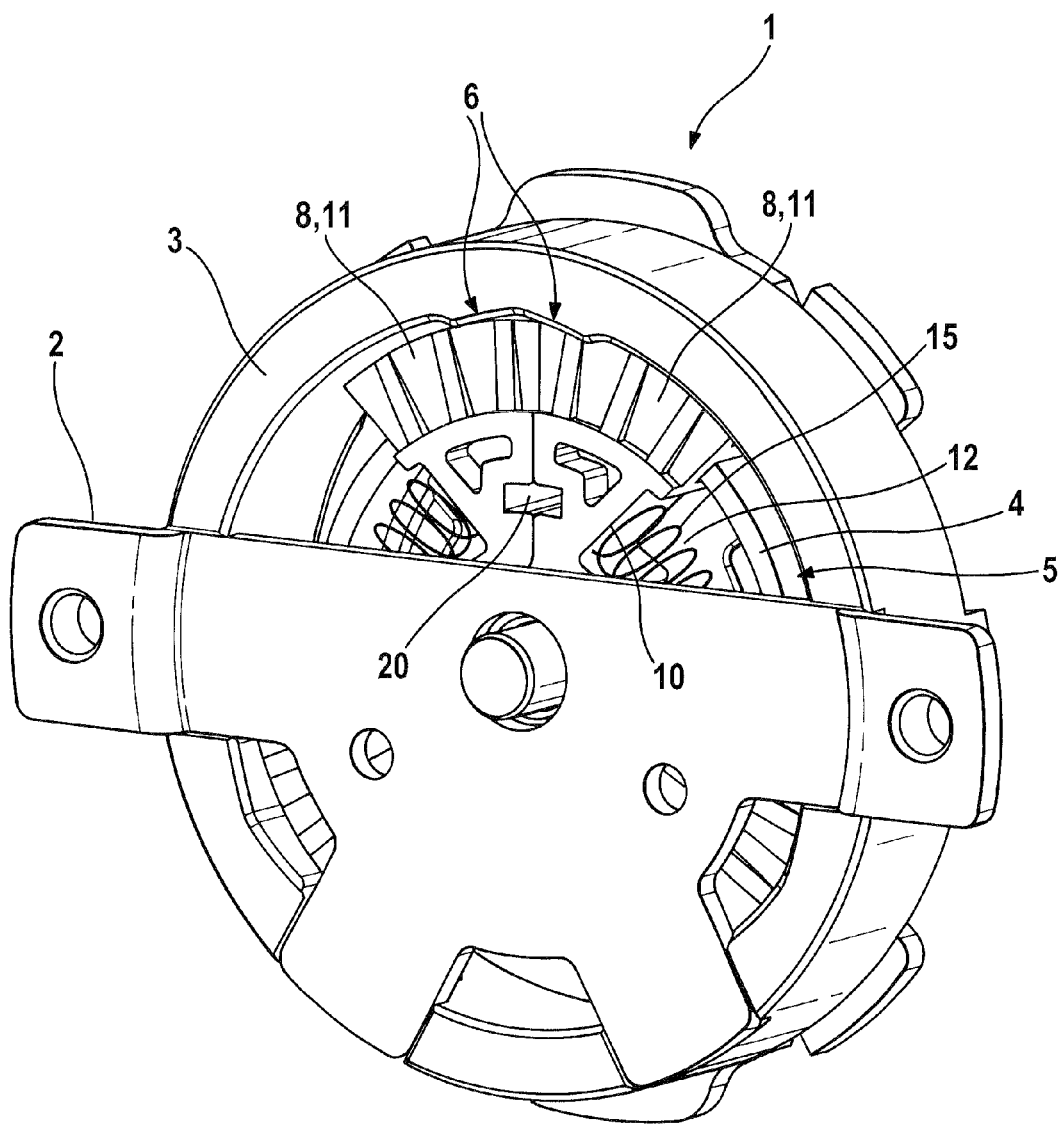
Figure 4:
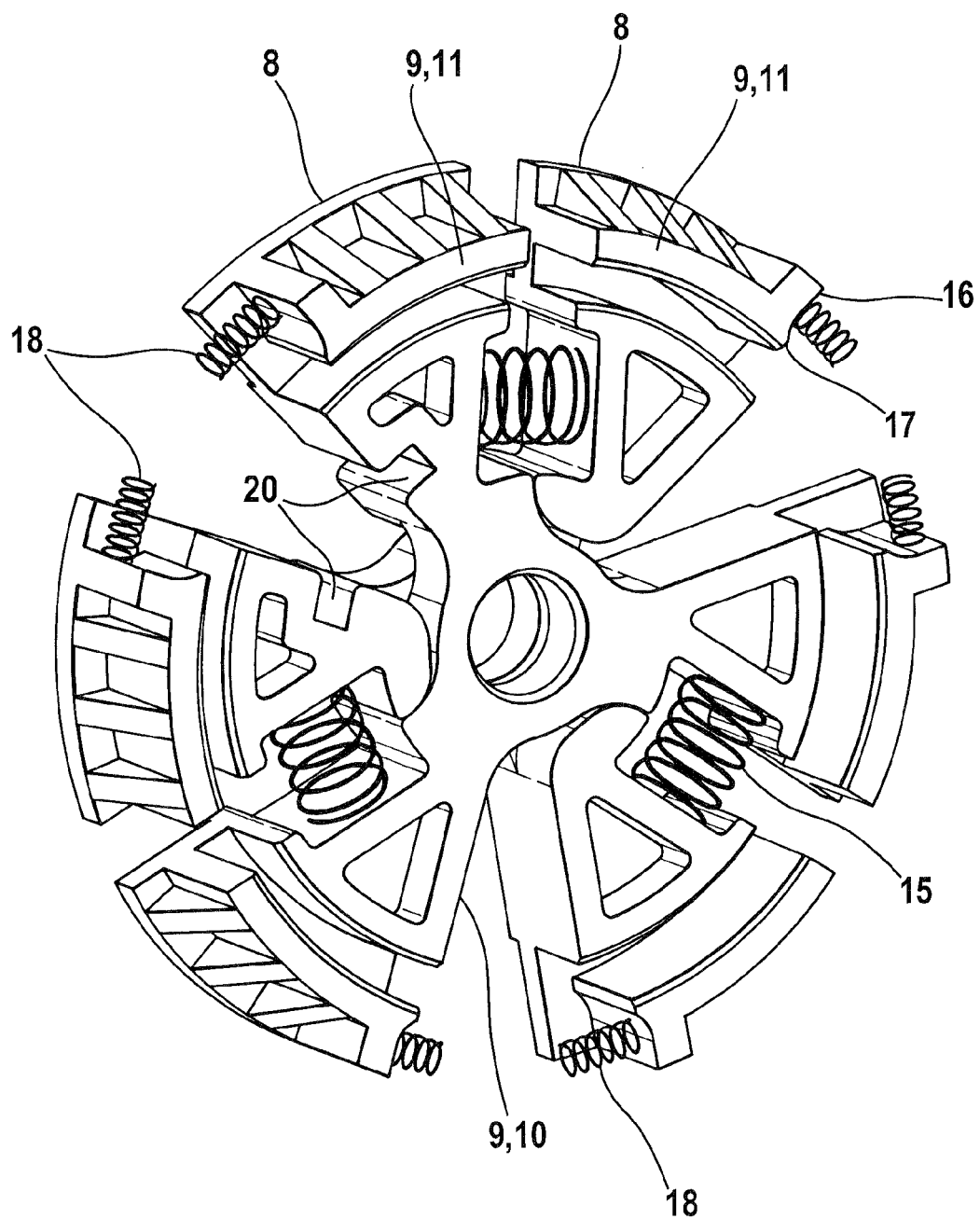
FIG. 4 shows a spring carrier of the step-by-step mechanism according to FIG. 1, and FIGS. 5 and 6 show the step-by-step mechanism according to FIG. 1 in the drive position.

FIGS. 1 to 6 show essential components of a step-by-step mechanism 1 of a seat adjustment means (not shown in further detail) in a motor vehicle. A manually actuable pivoting lever (not shown) is fastened to a drive element 2, also denoted as driver. The drive element 2 is connected fixedly in terms of rotation to an outer ring 3 which engages around an inner ring 4 which acts as driven element, with the formation of an annular space 5. In a deviation from the illustration according to FIG. 1, it is also possible to provide a single part, in particular a sintered part, which combines the functions of the outer ring 3 and the drive element 2. The inner surface of the outer ring 3 has double clamping ramps 6, while the outer surface of the inner ring 4 is of completely cylindrical configuration. In the neutral position of the step-by-step mechanism 1 (FIGS. 2 and 3), individual clamping elements 7, namely three clamping rollers, are situated in the center of in each case one double clamping ramp 6. The clamping elements 7 are provided for interaction with the rings 3, 4 and with two spring carriers 8. Each spring carrier 8 has the basic shape of a three-armed star, each arm 9 having an inner section 10 and an outer section 11. While the last mentioned section 11 engages into the annular space 5, the inner section 10 engages into an inner space 12 which is arranged radially within the inner ring 4. The spring carriers 8 are plugged onto a pin (not shown) which also penetrates an opening 13 of a housing component 14 which engages partially around the outer ring 3 and is manufactured as a sheet metal part which is formed without the removal of material. The position of said pin which is connected fixedly in terms of rotation to a driven element (not shown) of a clamping roller locking mechanism interacting with the step-by-step mechanism specifies the axial direction of the step-by-step mechanism 1.

The spring carriers 8 which are mounted such that they can be pivoted relative to one another are clamped against one another by three springs 15 which are arranged in the inner space 12; said springs are helical springs which are formed as compression springs. In the arrangement according to FIG. 4, the spring carriers 8 are positioned relative to one another in such a way that stop faces 16 which are arranged in the annular space 5 are at a maximum spacing from one another. The clamping elements 7 (not shown in FIG. 4) are situated between stop faces 16 of different spring carriers 8. In each case one foot 17 is formed on the stop faces 16, which foot 17 ensures that the clamping elements 7 are raised up from the inner ring 4 when the step-by-step mechanism 1 is situated in the neutral position. As an option, freewheeling springs 18 are clamped between the clamping elements 7 and the stop faces 16, which freewheeling springs 18 are not a precondition for the function of the step-by-step mechanism, however.

Figure 5:
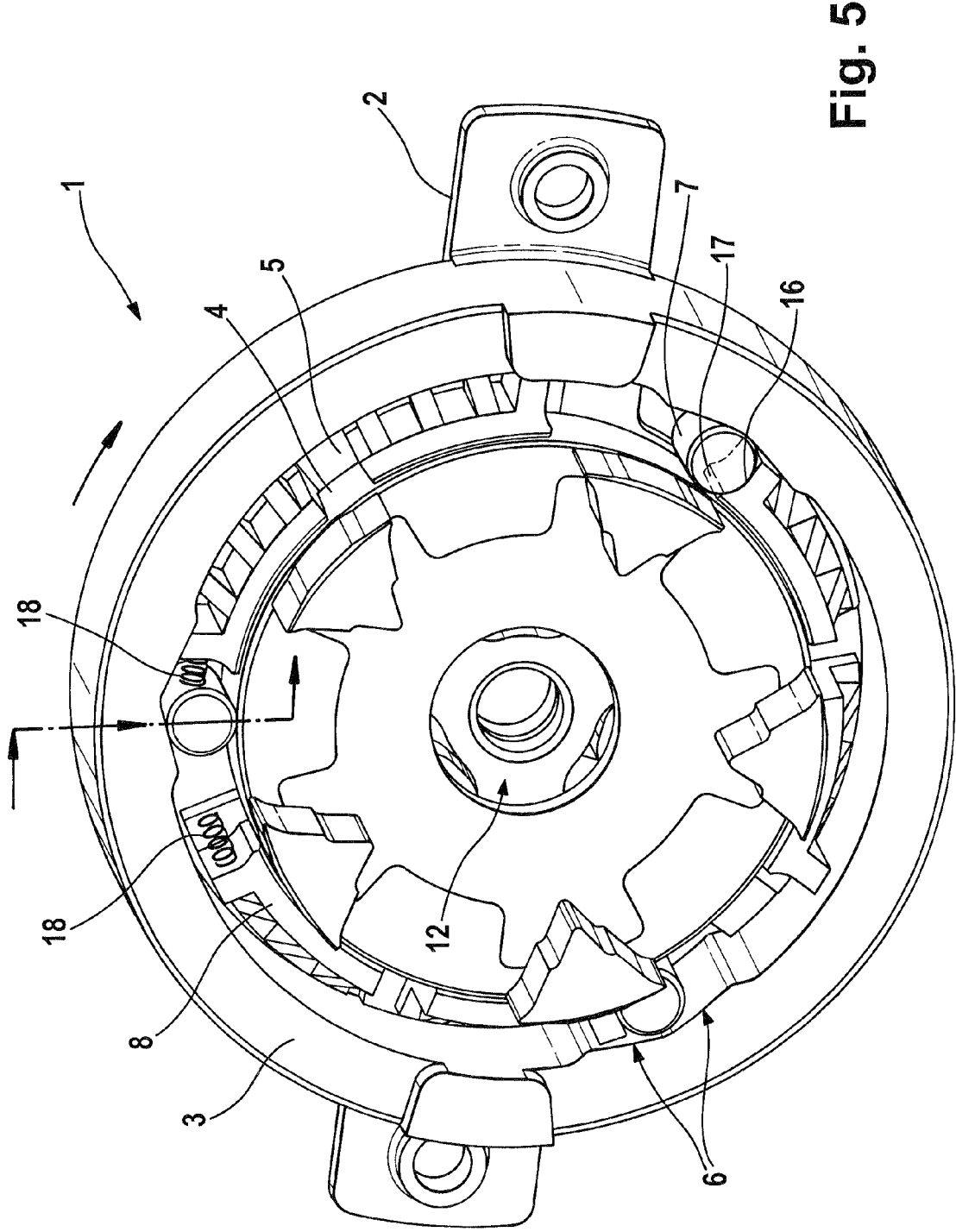
Figure 6:
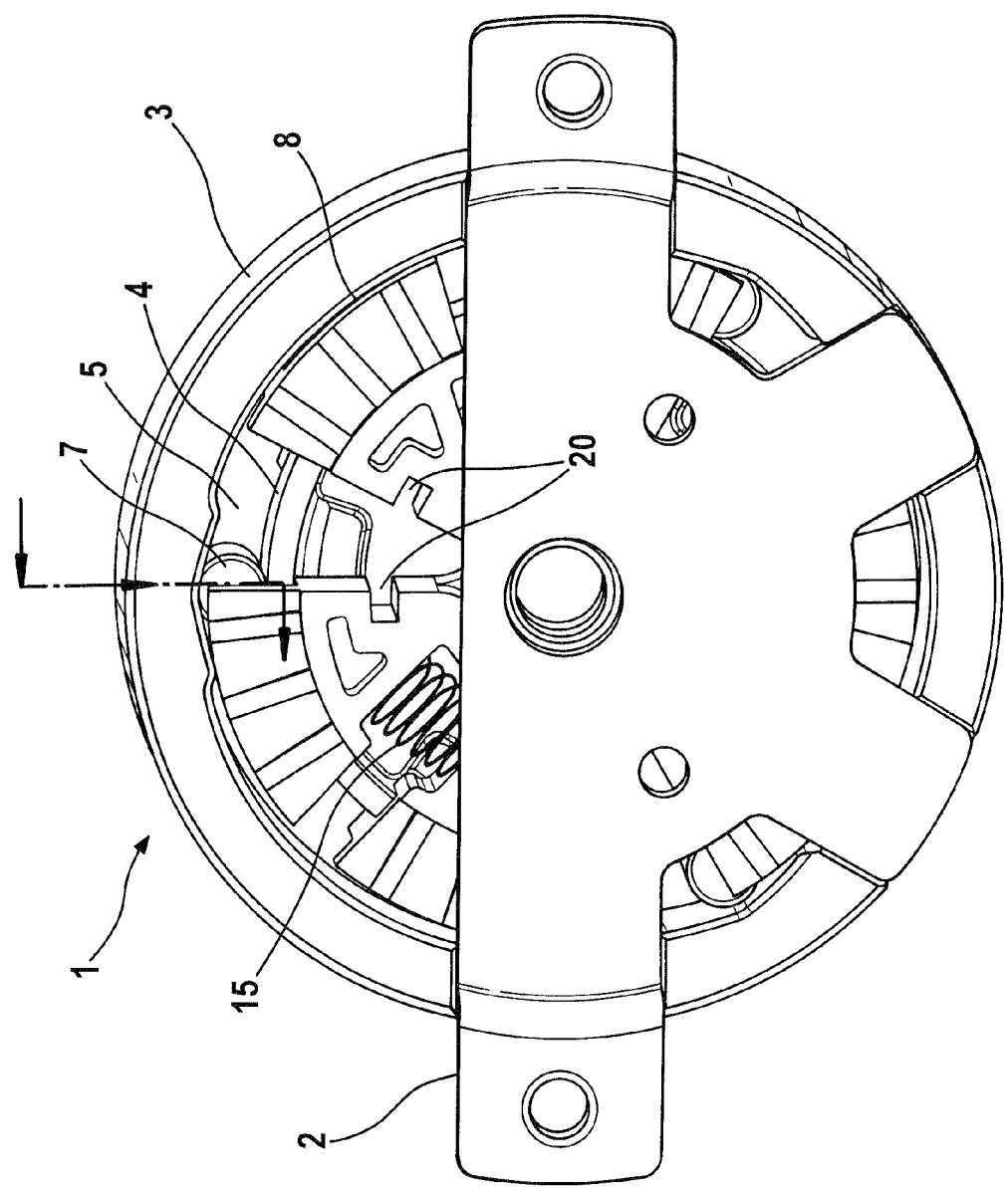

If the outer ring 3 is pivoted relative to the housing component 14 by means of the drive element 2, both spring carriers 8 remain in an unchanged angular position with a minimum spacing between the stop faces 16 until a force flow is produced from the outer ring 3 to the inner ring 4 via the clamping elements 7. In the further course of the pivoting movement, the arms 9 of a spring carrier 8 are driven by the clamping elements 7, while the other spring carrier 8 is held fixedly by means of a stop 19 which engages into a cutout 20 between the spring carriers 8. Here, the springs 15 which are clamped between the arms 9 of the two spring carriers 8 are compressed further. The step-by-step mechanism 1 is restored into the neutral position from the drive position which is shown in FIGS. 5 and 6 by the springs 15 expanding, the stop faces 16 pressing against the clamping elements 7 which for their part drive the outer ring 3. The inner ring 4 which is connected fixedly in terms of rotation to claws 21 of a clamping roller locking mechanism (not shown in further detail) remains in an unchanged angular position here.

LIST OF DESIGNATIONS

1 Step-by-step mechanism
2 Drive element
3 Outer ring
4 Inner ring
5 Annular space
6 Double clamping ramp
7 Clamping element
8 Spring carrier
9 Arm
10 Inner section
11 Outer section
12 Inner space
13 Opening
14 Housing
15 Spring
16 Stop face
17 Foot
18 Freewheeling spring
19 Stop
20 Cutout
21 Claw

The invention claimed is:

1. A step-by-step mechanism for a seat adjustment means in a motor vehicle, comprising a housing component, in which an outer ring which can be connected to a drive element or is configured in one piece with the latter and an inner ring which acts as driven element are arranged concentrically, clamping elements which interact with double clamping ramps on at least one of the rings being arranged in an annular space which is formed between the outer ring and the inner ring, and having two spring carriers which are arranged concentrically with respect to the rings, can be pivoted with respect to one another, interact with a stop on the housing component and engage in each case both into the annular space and into an inner space which is arranged radially within the inner ring, the spring carriers being clamped against one another by means of at least one spring which is arranged in the inner space, in such a way that, in order to secure the clamping elements in the center of the double clamping ramps, suitable stop faces of the spring carriers are loaded with a force in the direction of their minimum spacing.

2. The step-by-step mechanism as claimed in claim 1, wherein the spring carriers are manufactured from plastic.

3. The step-by-step mechanism as claimed in claim 1, wherein each spring carrier has the basic shape of a three-armed star.

4. The step-by-step mechanism as claimed in claim 1, wherein the spring is configured as a helical spring.

5. The step-by-step mechanism as claimed in claim 1, wherein the number of springs corresponds to the number of clamping elements.

6. The step-by-step mechanism as claimed in claim 1, wherein all the springs are arranged outside the annular space.

* * * * *